US006963970B2

(12) United States Patent
Culter et al.

(10) Patent No.: US 6,963,970 B2
(45) Date of Patent: Nov. 8, 2005

(54) SYSTEM AND METHOD FOR EXECUTING A FAST RESET OF A COMPUTER SYSTEM

(75) Inventors: Bradley Culter, Dallas, TX (US); Subramanian Ramesh, Plano, TX (US); Matthew Fischer, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 589 days.

(21) Appl. No.: 10/136,580

(22) Filed: Apr. 29, 2002

(65) Prior Publication Data

US 2003/0204710 A1    Oct. 30, 2003

(51) Int. Cl.[7] .............................. G06F 9/00; G06F 9/24; G06F 13/24
(52) U.S. Cl. ................ 713/1; 713/2; 710/260
(58) Field of Search ................ 713/1, 2; 712/227

(56) References Cited

U.S. PATENT DOCUMENTS 6,434,696 B1 * 8/2002 Kang ..................... 713/2
6,594,756 B1 * 7/2003 Datta et al. .............. 713/2
6,775,728 B2 * 8/2004 Zimmer et al. .......... 710/260

OTHER PUBLICATIONS

EFI 1.1, Speedy Boot Specification, Draft for Review, Version 0.9; Jun. 5, 2001; 11 pages; Intel.

* cited by examiner

Primary Examiner—Lynne H. Browne
Assistant Examiner—Stefan Stoynov (57) ABSTRACT

A system and method for implementing a fast reset of a computer system is described. In one implementation, the fast reset is implemented by adding a new ResetType to the EFIResetSystem( ) function. In particular, a third ResetType, i.e., "EfiResetFast" (FAST option), is added, which is passed as a parameter when calling the EFIResetSystem( ) function. In another implementation, the fast reset is implemented using a new EFI function, referred to herein as "EFIReset-Fast( )". In either implementation, in response to a fast reset, the firmware skips several steps typically performed, including some of the core firmware construction, single cell initialization, memory testing, memory re-initialization, and partition creation, and proceeds directly to transfer of control of the platform to a software interface disposed between an OS and firmware.

19 Claims, 5 Drawing Sheets

SYSTEM AND METHOD FOR EXECUTING A FAST RESET OF A COMPUTER SYSTEM

BACKGROUND OF THE INVENTION

1. Technical Field of the Invention

The present invention generally relates to computer systems. More particularly, and not by way of any limitation, the present invention is directed to a system and method for implementing a fast reboot, or reset, of a computer system.

2. Description of Related Art

During development and testing of a computer system, the system will be rebooted very often. It would not be unusual for a large computer system to take 10 to 15 minutes to completely reboot. If a system is rebooted a number of times each day, which is typically the case, a considerable amount of time may be spent simply waiting for the system to reboot. For example, assuming a particular system takes 15 minutes to reboot and is rebooted 12 times a day, three hours are essentially wasted simply waiting for the system to reboot. Clearly, this is an inefficient use of valuable time and resources and adds to the overall expense of developing and testing, and therefore producing, a computer system.

The Extensible Firmware Interface ("EFI") specification, developed by Intel Corporation, defines a new model for an interface between a computer's operating system ("OS") and platform firmware. The interface consists of data tables that contain platform-related information, plus boot and runtime service calls that are available to the OS and its loader. Together, these provide a standard environment for booting an OS and running pre-boot applications. One service provided by EFI is an "EFIResetSystem( )" function, which resets the entire platform, including all processors and devices, and reboots the system. Calling the function with a ResetType of "EfiResetCold" (COLD option) causes a system-wide reset. This sets all circuitry within the system to its initial state. This type of reset is asynchronous to system operations and operates without regard to cycle boundaries. EfiResetCold is tantamount to a system power cycle. Calling the function with a ResetType of "EfiResetWarm" (WARM option) causes a system-wide initialization. The processors are reset to their initial state and pending cycles are not corrupted. As evident from the foregoing, a "WARM" reset is accomplished more quickly than a "COLD" reset; however, neither are suitably fast to solve the problems addressed above with regard to the substantial delay caused by the multiple resets that take place during development and testing of a new system.

One solution to the aforementioned problem will be referred to herein as "Speedy Boot". The Speedy Boot specification defines certain EFI boot variables that can be used by an OS to communicate boot options to system firmware. In effect, Speedy Boot causes a system to undergo a full reset and then skips certain initialization steps as indicated by the EFI boot variables that are set by the OS. In operation, the OS writes to the EFI boot variables to set options for subsequent boots. Optionally, the user can also write to the EFI boot variables using a firmware user interface. The system firmware, EFI and option ROMs read from the EFI boot variables during Power-On Self-Test ("POST") to determine what actions to take. Hence, Speedy Boot provides a partial time-savings when a system is rebooted several times, e.g., during development; however, it may not be as significant as would be desirable in a large system.

Additionally, according to the Intel EFI specification, during early initialization of the OS, the OS is required to call an EFI function referred to as ExitBootServices( ). This function call results in some EFT functionality being disabled until the system goes through a complete reset and EFI is reinitialized. It will be recognized that there will be instances in which it may be helpful to have access to system state variables that are lost by performing a full reset, for example, for debugging purposes. Presently, there is no mechanism by which to access that data.

SUMMARY OF THE INVENTION

Accordingly, the present invention advantageously provides a system and method for implementing a fast reset function in a computer system. In general, during a fast reset, the firmware is operable to skip several steps typically performed, including some of the core firmware construction, single cell initialization, memory testing, memory re-initialization, and partition creation.

In one aspect, the invention comprises a method of implementing an expedited reset of a computer system comprising an operating system ("OS"), platform hardware, processor hardware, and firmware disposed between the platform and processor hardware and the OS, the method comprising the steps of receiving a fast reset request; and, responsive to receipt of the fast reset request, omitting at least a portion of setting up of a System Abstraction Layer ("SAL") of the firmware and substantially immediately transferring control of the computer system to a software interface between the OS and the firmware.

In another aspect, the invention comprises a method of implementing an expedited reset of a computer system comprising an OS, platform hardware, processor hardware, and firmware disposed between the platform and processor hardware and the OS, the method comprising the steps of, responsive to a reset event, determining whether the reset event is a normal reset event; if the reset event is a normal reset event, initiating a full reset of the computer system; and if the reset event is not a normal reset event, implementing a fast reset of the computer system, wherein the fast reset comprises omitting at least a portion of setting up of a System Abstraction Layer of the firmware and instead initializing an interface disposed between the OS and the platform hardware of the computer system.

In another aspect, the invention comprises a system for implementing an expedited reset of a computer system comprising an OS, platform hardware, processor hardware, and firmware disposed between the platform and processor hardware and the OS, the system comprising means for determining whether the reset event is a normal reset event; means for initiating a full reset of the computer system if the reset event is a normal reset event; and means for implementing a fast reset of the computer system, if the reset event is not a normal reset event, wherein the fast reset comprises omitting at least a portion of setting up of a System Abstraction Layer of the firmware and instead initializing an interface between the OS and the platform hardware of the computer system.

In another aspect, the invention comprises a computer system comprising an OS; platform hardware; processor hardware; firmware disposed between the platform and processor hardware and the OS; and a software interface between the firmware and the OS, the software interface for enabling a plurality of function calls; wherein, responsive to a fast reset event, a fast reset of the computer system is executed. In one exemplary implementation, the fast reset comprises omitting at least a portion of setting up of a System Abstraction Layer of the firmware and instead immediately initializing an interface between the OS and the platform hardware of the computer system.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

In the drawings, like or similar elements are designated with identical reference numerals throughout the several views thereof, and the various elements depicted are not necessarily drawn to scale.

Figure 1:
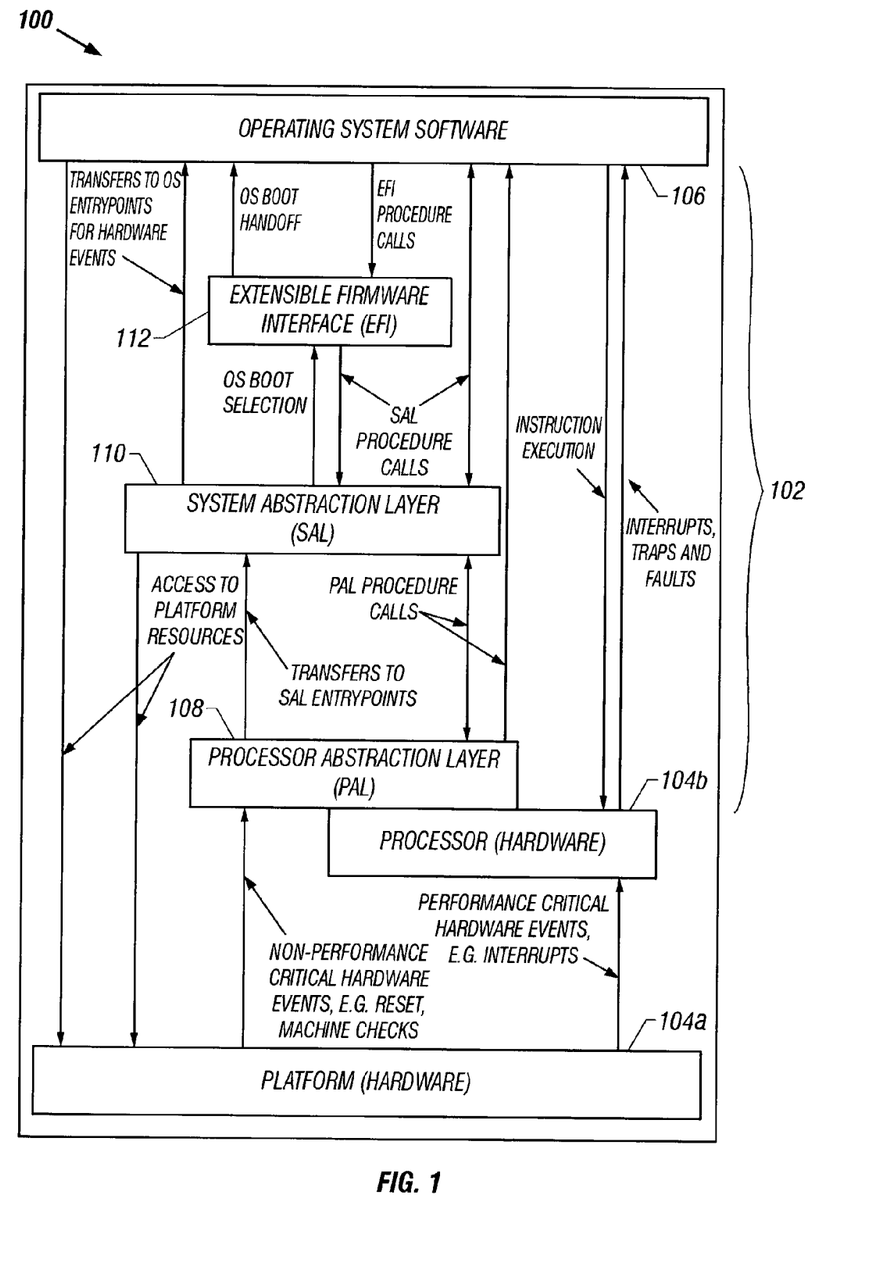
FIG. 1 illustrates a conceptual block diagram of a firmware services model embodying features of one implementation of the present invention.

FIG. 1 illustrates a firmware services model of a computer system platform 100 in which the configurations of the invention described herein may be implemented. For purposes of example, the platform 100 comprises a multicellular processor server platform in which the processors are implemented using Intel IPF processors; however, it will be recognized that application of the present invention is not limited to a particular platform.

As illustrated in FIG. 1, firmware 102 lies between platform and processor hardware 104a, 104b, respectively (collectively, "hardware"), and OS software 106. In one exemplary implementation, the firmware comprises three main layers, including a Processor Abstraction Layer ("PAL") 108, a System Abstraction Layer ("SAL") 110, and an Extensible Firmware Interface ("EFI") layer 112. Although the terms such as PAL, SAL, et cetera, have been known in the context of the Intel Processor Family (IPF) Architecture, it should be understood by those skilled in the art that such terms can be applied to any layered hardware/software architecture with respect to other processor families as well.

In one exemplary implementation, accordingly, the PAL 108 encapsulates processor model specific hardware and is part of the Intel IPF Processor Instruction Set Architecture ("ISA"). The PAL 108 is the firmware layer that abstracts processor implementation-specific features and is independent of the number of processors. The PAL 108 is designed to initialize the processor hardware 104b and interacts with both the SAL 110 and the OS 106 as illustrated in FIG. 1.

The SAL 110 is a platform specific firmware component that isolates the OS 106 and other higher level software from implementation differences in the specific platform configuration. In particular, the SAL 110 is responsible for initializing the platform hardware 104a, as well as for initializing connections between processors and main memory. In the exemplary configuration of FIG. 1, the SAL 110 does not include any I/O device drivers. Essentially, the SAL 110 interacts with the EFI layer 112 and the OS 106 as illustrated in FIG. 1.

In one embodiment, the EFI layer 112 is a platform-binding specific layer that provides a legacy-free Application Programming Interface ("API") to the OS loader. The EFI layer 112 is primarily responsible for booting the OS 106 in the sense that it has I/O device driver functionality for loading the OS/OS loader into main memory and passing control to it. The EFI layer 112 interacts with the OS 106 as illustrated in FIG. 1.

The PAL 108 is typically provided with the processor hardware complex by the vendor. In contrast, the platform vendor has to develop or have developed the SAL 110 and EFI layer 112 for the particular platform. The PAL 108, the SAL 110, and the EFI layer 112 together provide system initialization, boot, and other functions that vary between platforms.

As will be described in greater detail below, in a first exemplary configuration, a fast reset function is implemented by adding a new ResetType to the EFIReset System( ) function. As described above, presently, the ResetTypes are EfiResetCold and EfiResetWarm. The first implementation would add a third ResetType, i.e., "EfiResetFast" (FAST option), which is passed as a parameter when calling the EFIResetSystem( ) function. In a second exemplary configuration, a fast reset function is implemented using a new EFI function, referred to herein as "EFIResetFasto", which is unrelated to and independent of the EFIResetSystem( ) function. This second implementation would entail adding a new global unique identifier ("GUID") and a new EFI service, which the OS would discover on boot. Regardless of which configuration is implemented, there are common implementation steps that are performed. In order to activate the new EFI service, a new argument is added to the reboot command. As a practical matter, this argument may be limited to internal debug kernels because of the potential instability of a computer system after a fast reset. A currently unused option is used for this purpose.

Before using the EFIResetFasto function, the OS must perform several steps to prepare to hand the computer system to firmware. The first step is to end all I/O and memory operations (e.g., Direct Memory Access or DMA transactions) and idling the I/O hardware. The next step is to flush all the caches of processor(s) returning to firmware. The final step is to cause all non-boot start-up processor ("non-BSP") processors to enter the idle loop and wait. The OS must ensure these steps are completed before using the EFIResetFasto option.

In the first implementation, the OS calls EFIResetSystem with ResetType EfiResetFast when reboot with the special option is called. If the call fails (because the FAST option is not supported), the OS may use one of the standard EFIResetSystem options (WARM or COLD). In the second implementation, the OS verifies that the EFIResetFasto function is supported by checking the EFI services table. If supported, it may be used. If not, it will fail back onto one of the standard EFIResetSystem( ) options (WARM or COLD). Once the firmware gets the EFIResetFast signal from the OS, the firmware will perform a reduced number of initialization steps and bring the system back up to the EFI prompt.

Figure 2:
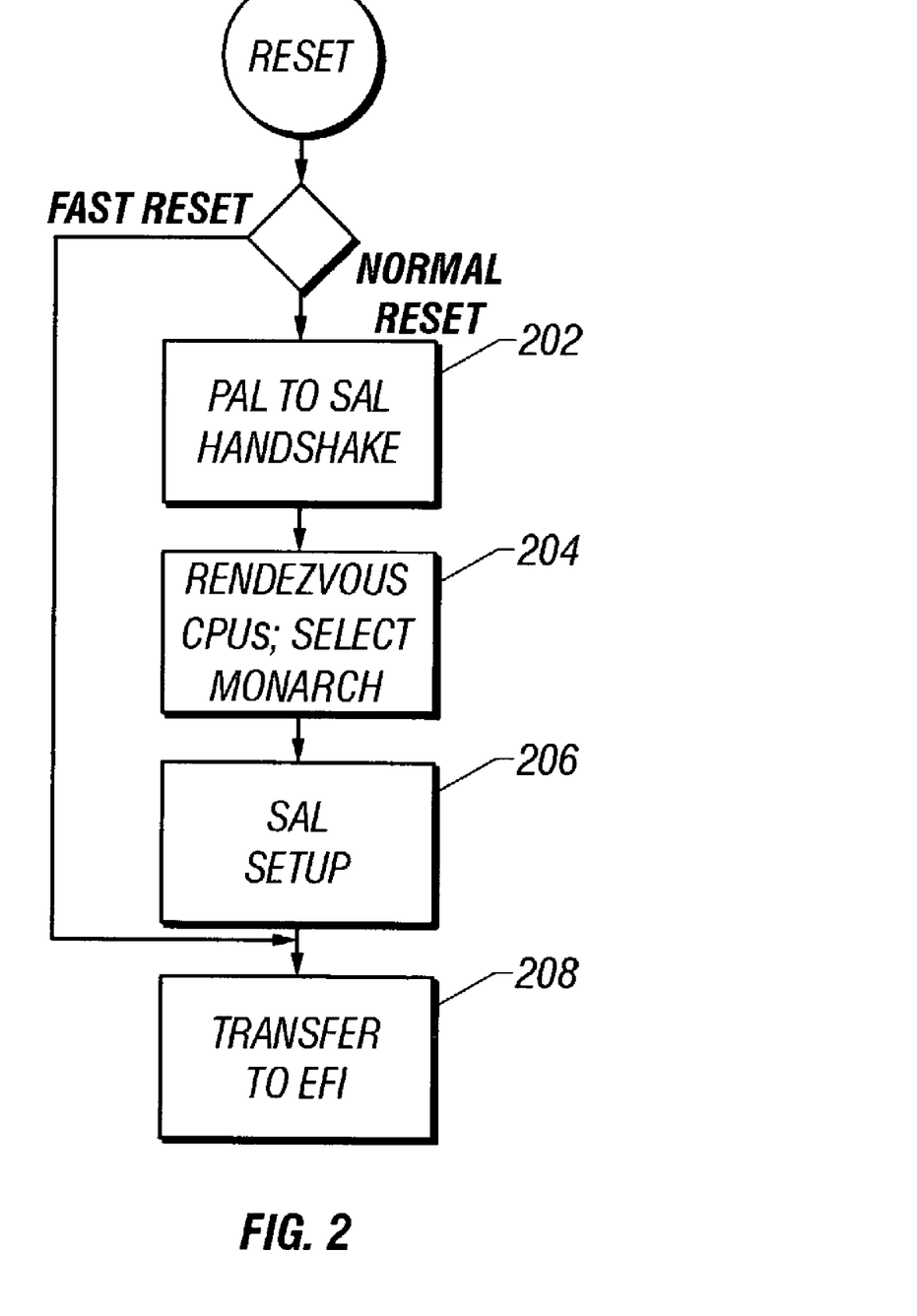
FIG. 2 is a flow diagram illustrating operation of one implementation of the present invention.

FIG. 2 is a flow diagram illustrating operation of one implementation of the present invention for implementing a fast reset of a computer system platform, such as the platform 100 shown in FIG. 1. Execution begins in response to a reset of the platform. If the reset is a "Normal" reset, meaning that the reset occurred in response to the platform being powered on or in response to a Warm or Cold reset, execution proceeds to step 202, in which a PAL-to-SAL handshake is executed in a conventional fashion, and then to step 204, in which CPU rendevous is performed and a monarch is selected. Execution then proceeds to step 206, in which SAL setup is performed. It will be recognized that the steps involved in performing SAL setup will vary according to the particular platform being implemented; however, in one implementation, SAL setup includes one or more of the following steps: core firmware construction; single cell initialization; memory testing; memory re-initialization; partition creation; and table construction for Advanced Configuration Power Interface ("ACPI").

After SAL setup has been completed, execution proceeds to step 208, in which control is transferred to EFI, at which point the SAL copies the EFI program out of ROM into main memory, activates it, and passes control to it to initiate booting of the OS.

In contrast, in accordance with features of one implementation of the present invention, if the reset is not a normal reset but is instead a "fast reset", execution proceeds directly to step 208, omitting performance of steps 202, 204, and 206. It will be appreciated, therefore, that a substantial time savings can be realized by using the fast reset option.

As noted above, there are at least two manners in which a fast reset function could be implemented. In a first implementation, a third ResetType, i.e., "EfiResetFast" (FAST option), which is passed as a parameter when calling the EFIResetSystem( ) function, is added as an option to the EFIResetSystem( ) function. In a second implementation, a new EFI function, referred to herein as "EFIResetFasto", which is unrelated to and independent of the EFIResetSystem( ) function, is added to the EFI services. This second implementation would entail adding a new global unique identifier ("GUID") and a new EFI service, which the OS would discover on boot.

Figure 3:
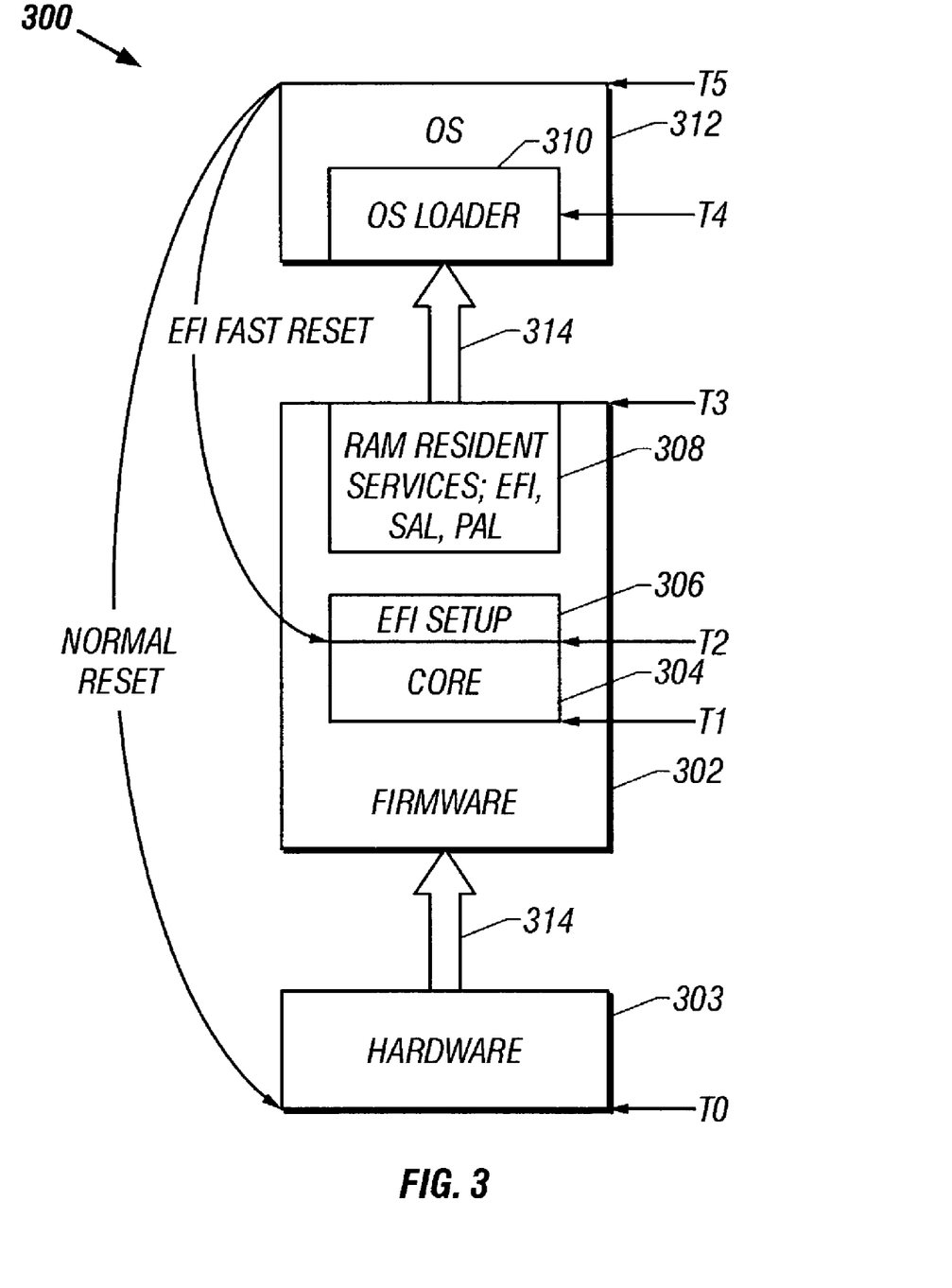
FIG. 3 is a modified timing diagram illustrating operation of one implementation of the present invention.

FIG. 3 is a diagram illustrating operation of a fast reset function in accordance with one embodiment of the present invention. As illustrated in FIG. 3, time T0 represents the time at which a computer system platform 300 is turned on. As power begins to come on, firmware 302 takes control of the platform 300 after any necessary checks of hardware 303 are completed. At time T1, firmware 302 begins initializing a core 304. During core initialization, devices are discovered and initialized, memory is tested and set to a predetermined initial pattern (e.g., all zeros). Additionally, the processors are tested and partitions are created.

At time T2, EFI setup 306 is performed and EFI services are initialized. Specifically, EFI is prepared to run in main memory and the EFI system is set up. At time T3, EFI services, as well as other RAM-resident services 308, are available. Time T3 represents the point in time at which an EFI prompt is displayed and at which an OS loader 310 may begin to load an OS 312. At time T4, the OS loader 310 calls an ExitBootServices function. The ExitBootServices function places EFI in a mode in which certain functionality thereof is disabled. There is no means by which to "undo" the effect of an ExitBootServices call. Time T5 corresponds to the time at which the OS 312 is up and running.

In response to a Normal reset, as defined above with reference to FIG. 2, the platform 300 returns to the state represented by time T0; in other words, a full reset of the platform 300 is performed. At this point, system boot proceeds as indicated by arrows 314. In contrast, in accordance with features of the implementations described herein, a fast reset of the computer system returns the system to the state represented by time T2; all of the initialization from T0 to T2 is omitted. One result of a fast reset is that it leaves the contents of certain registers undisturbed. This can be useful for debugging and other purposes and provides a way around the effects of the ExitBootServices call.

It is worth recalling that the Speedy Boot functionality described above performs a full reset of the platform; that is, it returns the computer to the state represented by T1, and then skips certain initialization steps between times T1 and T2 (in addition, the OS 312 may skip steps between T4 and T5), as indicated by the EFI boot variables. Accordingly, it is typically not as fast as the fast reset function described herein. Moreover, the fast reset function eliminates the need to run all of the code that reinitializes the interactions between the PAL and the SAL, main memory, and the links between main memory and the processors and I/O bridges. Instead, the program image is copied from ROM into main memory, which remains initialized, and is used to relaunch the OS. As an indirect result, the platform-specific state variables that are retained in hardware, or firmware, log registers are not reinitialized and may be accessed during reset of the computer. As alluded to in the foregoing, retention of these variables, but reinitialization of the computer firmware, will often provide debugging value.

It will be recognized that, in addition to the two techniques described hereinabove for invoking the fast reset function, there are numerous other methods for doing so. Three such other methods are described in greater detail below.

For example, the fast reset function may be implemented as a new SAL interface procedure. Similar to the embodiments described above, this alternative embodiment is also a procedure call mediated invocation; however, instead of calling a function built in to the EFI services portion of the firmware, the OS invokes a new SAL function that is added to the standard SAL or to an OEM extension to the SAL. If the new SAL function for implementing the fast reset feature is added to an OEM extension to the SAL, the function may be implemented as a proprietary Extensible SAL Interface ("ESI") function using the model defined in the Extensible SAL Specification, Version 1.0, available from Hewlett-Packard Company. The Extensible SAL Specification defines a forward-compatibility mechanism, using an EFI system table, as defined in section 4.5.1 of the EFI Specification, Version 1.02, whereby an OS may query the SAL implementation of a platform using an OEM-defined function designated "SAL_QUERY" in order to discover if that implementation supports another OEM-specific SAL extension. It will be assumed for the purposes of example that this procedure is named "SAL_FAST_RESET". An OEM vendor publishes a GUID and SAL Function ID of the SAL_FAST_RESET procedure that the implementation contains. The OEM implements the SAL_QUERY procedure using the same GUID. To invoke this feature, an OS invokes SAL_QUERY with the GUID and passes the SAL Function ID of the SAL_FAST_RESET extension to discover if the platform provides this feature. Such a check could be performed at boot time and its results retained for later use; alternatively, it could be deferred until the OS actually attempts to invoke the fast reset function.

The sequence of interactions between the OS and platform firmware for implementing this alternative method is very similar to the embodiments described above and will therefore not be further described in detail.

Another alternative method for implementing the fast reset function is referred to herein as a Platform Manageability Interrupt ("PMI") model. As will be recognized by one of ordinary skill in the art, the IPF instruction set architecture, as defined by Intel Corporation, defines a richly-featured interrupt architecture. PMI is an asynchronous highest-priority external interrupt that encapsulates a collection of platform-specific interrupts. PMIs occur during instruction processing, resulting in control flow being passed to a PAL PMI handler. During this process, certain processor state is automatically saved by the processor hardware and the processor starts executing instructions beginning at a PALE_PMI entrypoint, then transitions to SAL PMI code. When processing is completed, the SAL PMI code returns to PAL PMI code to restore the interrupted processor state and to resume execution at the interrupted instruction.

PMI messages can be delivered by an external interrupt controller or as an interprocessor interrupt ("IPR") using delivery mode 010. Hardware events, including IPR messages, that can trigger PMI requests delivered to an IPF processor are referred to as "PMI events". PMI events are the highest-priority external interrupts and are only maskable by disabling interrupt collection (setting PSR.ic=0). This will only be done when system software is processing extremely critical tasks, since it prevents the processor from saving interruption collection state necessary to resume from an interruption. There are 16 PMI interrupt vectors, or levels. Twelve of these (vectors 4–15) are reserved to Intel PAL; four (vectors 0–3) are reserved for SAL. Vector 0 is used to indicate a PMI pin event. The PMI pin is a signal in put on the processor that may be sourced by a PMI signal. Higher vector numbers have higher priority.

PMI is apparently intended to enable transparent processing of platform-specific system functions. IPF processors implement the PMI to enable platform developers to provide high level system functions, such as power management and security, in a manner transparent to both application software and the OS.

Resetting the system is transparent to neither the system software nor firmware, since the operation is involved only when initiated by system software; therefore, the PMI invocation model embodiment of the present invention applies PMI in a novel way; that is, to pass explicit control to firmware for the purpose of invoking a platform-specific feature-EFI fast reset. The ability to do so is based on the following assumptions:

A PMI event will cause processor execution to branch directly into firmware

There are four PMI event vectors architecturally dedicated to SAL

Three of the PMI event vectors can be initiated by sending an IPR by system software to a processor The system software can guarantee the target processor has unmasked PMI events A platform implementation may define the functional behavior of the SAL PMI events to do anything the OEM desires Accordingly, in the PMI invocation model embodiment, the PMI message behaves as though it were a procedure call into firmware with an implicit argument. Normally, PMI handlers return control to the interrupted context after processing. That is true for normal firmware procedures as well. However, for the standard ResetSystem( ) firmware procedure, no return is expected. Likewise, for this PMI-delivered fast reset command, no return will be expected.

Any one (or all, depending on platform need for distinct PMI events) of the vectors 1, 2, or 3 could be used for the fast reset command. If a platform needed to use PMI events for more than three different operations, multiplexing of the fast reset event could be achieved in a number of ways. One is to define an EFI variable that would modulate the behavior of the shared PMI event. For example, a variable named "DoFastReset", whose value is a boolean state that is set to False at every reboot, can be defined. The OS performs the EFI fast reset operation in two steps. First, system software sets DoFastReset to True. Next, system software sends the designated PMI interrupt message to any one of the processors. This event is received in the processor, resulting in the processor vectoring to the PAL PMI handler, which in turn transfers to the SAL PMI handler. The SAL handler checks the value of the DoFastReset variable, notices that it is True, and begins the processing of the fast reset operation instead of the nominal event behavior.

PMI events are distinctly hardware-dependent. To use them in this fashion (i.e., as a specific OS-to-firmware command) require platform-specific knowledge to be encoded into the OS. Having platform-specific system software that "knows" which PMI event corresponds to the EFI fast reset is essentially no different than having that software "know" the GUID and EFI function number for an EFI procedure interface to the fast reset function.

However, including the following additional firmware functionality to describe and expose the PMI-mediated fast reset capability could enhance the portability of this portion of the system software. For example, if PMI fast reset is supported, the platform could expose an EFI variable referred to as "EFT_FastReset_Vector" and a corresponding EFI GUID. An OS would then scan the EFI variable list for this variable at some point prior to attempting to initiate the EFI fast reset function. If the variable does not exist, the feature is not implemented using PMI. If the variable does exist, the integer value of the variable (i.e., 1, 2, or 3) specifies the PMI vector level to sue when using an IPR to deliver the fast reset PMI message to a system processor so that the firmware will perform the reset.

Figure 4:
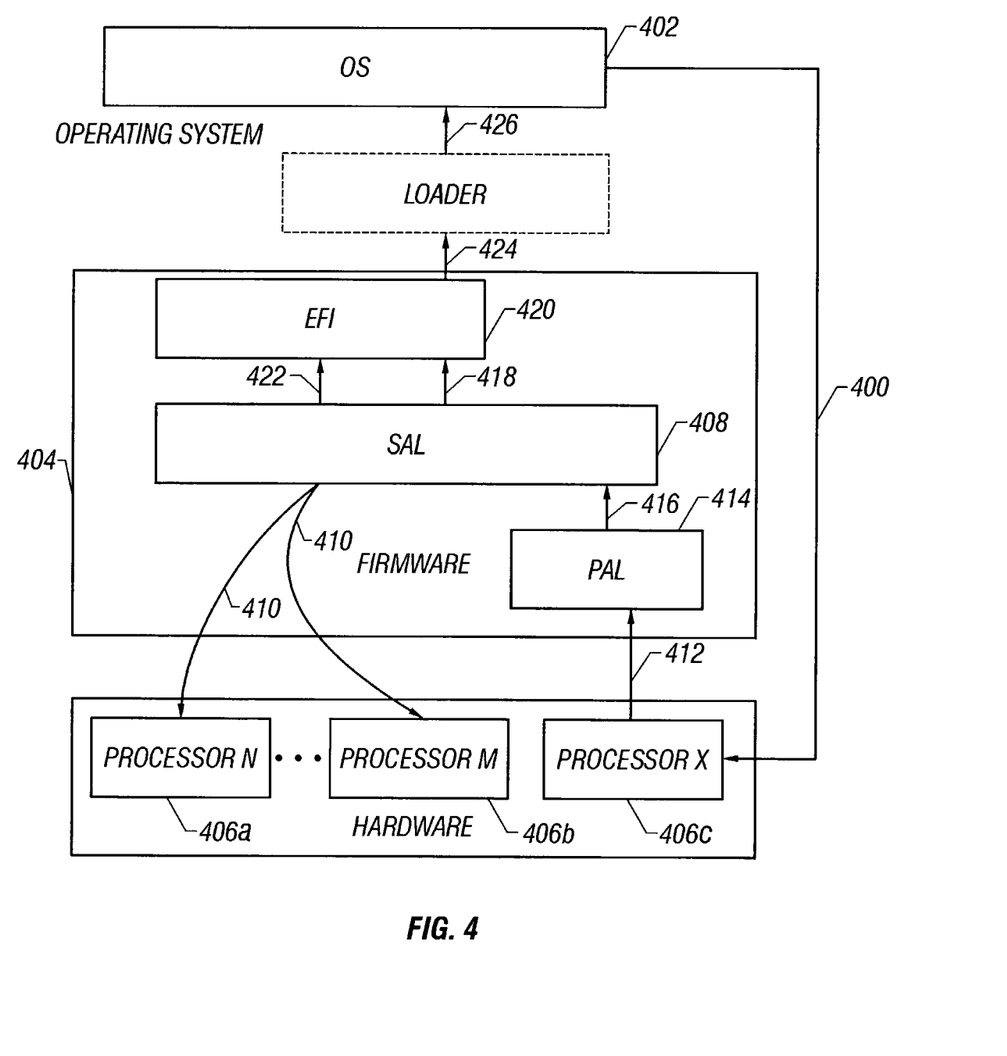
FIG. 4 is a conceptual block diagram illustrating operation of an alternative implementation of the present invention.

FIG. 4 is a block diagram of an exemplary implementation of the PMI invocation model for invoking the EFI fast reset function. For purposes of example and explanation, it will be assumed that the fast reset PMI vector defined in this platform is not shared (i.e., multiplexed) and that the system software has been written such that it knows which vector, i.e., 1, 2, or 3) corresponds to the EFI fast reset operation.

Referring now to FIG. 4, prior to sending a first message, represented in FIG. 4 by a path 400, an OS 402 returns control to firmware 404 of every processor 406*a*, 406*b* other than the one to receive the PMI message. In FIG. 4, a processor 406*c* is designated as the one to receive the PMI message. If possible, the target processor 406*c* should be the last processor, i.e., send the IPR to itself. If this is not possible, firmware 404 will still perform the reset and will attempt to rendezvous any processor not returned to SAL 408 prior to reception of a PMI event, represented in FIG. 4 by paths 410. Message 1 (path 400) initiates the sequence. The path 400 represents a PMI interrupt sent to the target processor 406*c*. Message 2, represented in FIG. 4 by a path 412, represents the processor 406*c* branching into a PAL PMI handler 414. Message 3, represented in FIG. 4 by a path 416, represents the processor 406*c* branching into a SAL PMI handler 408. Message 4 (path 410) (one per processor) is sent only if any of the processors 406*a*, 406*b*, other than the target processor (406*c*) (in a multiprocessor system) have not been previously rendezvoused in SAL. Message 4 (path 410) can be implemented using either PMI interrupt messages or INIT messages. Message 5, represented in FIG. 4 by a path 418, is sent only when all processors are under control of SAL 408. Message 5 (path 418) indicates the initialization of an EFI firmware layer 420 so that all boot-time services are activated again.

The remaining steps, represented by paths 422, 424, and 426, are identical to the final steps described above with respect to the first two embodiments. In particular, path 422 represents transfer of control to the EFI boot manager 420. Path 424 represents loading of an OS loader 428. Path 426 represents the passing of control to the loaded OS 402.

Another alternative embodiment involves invocation of an ACPI method in collaboration with a specific hardware capability built into the so-called "chipset", also referred to internally by HP as the "Core Electronic Complex" or "CEC". This embodiment is referred to herein as the "ACPI invocation model". Like the immediately preceding embodiment (the PMI invocation model), the ACPI invocation model utilizes PMI to signal the fast reset event, but not directly from system software. Instead, the ACPI system and platform-specific AML and hardware exist as a proxy to initiate the EFI fast reset PMI event.

Figure 5:
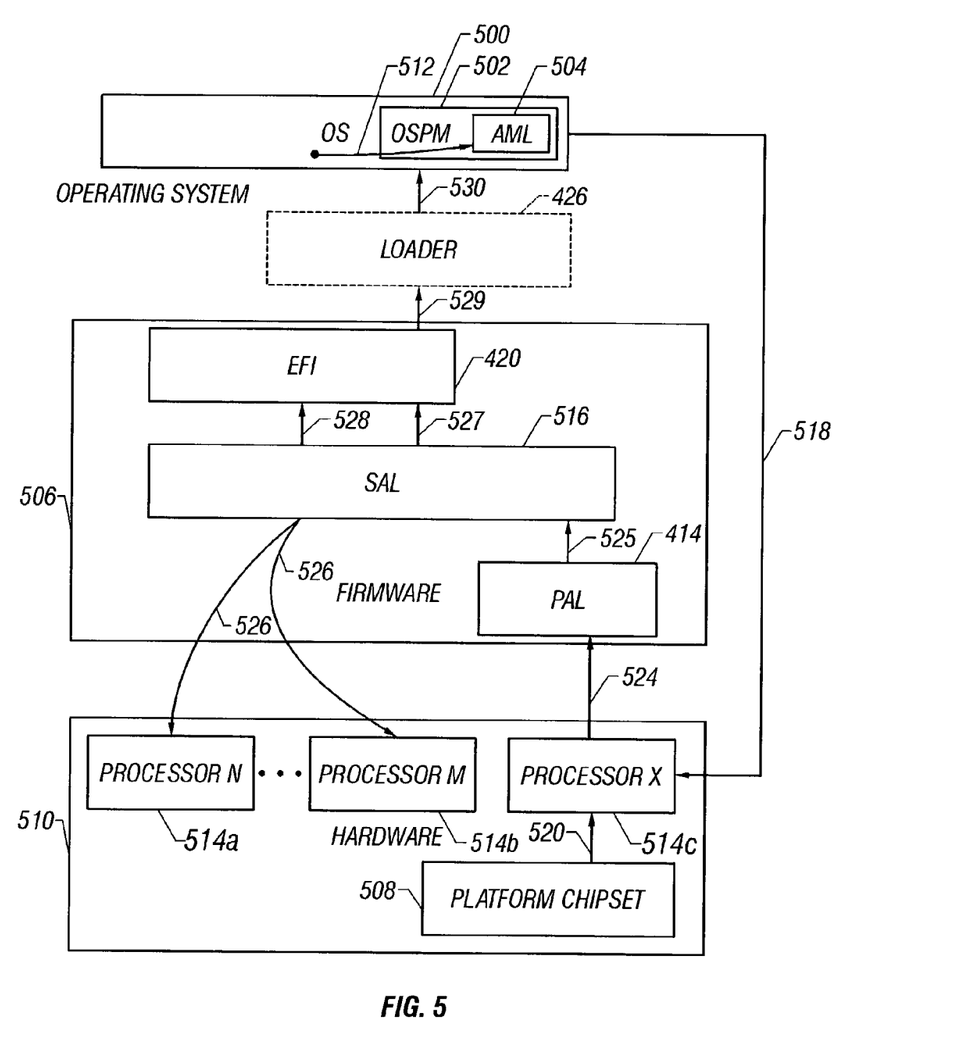
FIG. 5 is a conceptual block diagram illustrating operation of another alternative implementation of the present invention.

FIG. 5 is a block diagram of the ACPI invocation model. The ACPI invocation model illustrated in FIG. 5 is similar in many respects to the PMI model illustrated in FIG. 4 but includes some notable additional elements. In particular, as illustrated in FIG. 5, the OS 500 includes an OSPM 502. OSPM is the industry-standard name for the ACPI driver subsystem in an ACPI-enabled OS, such as the OS 500. Within the OSPM 502 is an AML 504, which represents a kind of firmware provided by the platform vendor that executes in an interpreted mode inside an OS context. At boot time, the OS 500 reads the AML 504 out of memory-resident tables built by firmware 506. A single operation in the AML 504 is called a method. Execution by an OS 500 of an AML method is called an invocation. This firmware can access specific platform-dependent resources, represented in FIG. 5 as a platform chipset component 508, located a hardware component 510. As will be described in greater detail below, in the ACPI invocation model, a platform-specific chipset register is implemented that has the ability to initiate a PMI message to a system processor.

For example, several types of capabilities could be implemented. One type would provide a mechanism to target individual processors and select the PMI level thereof. Another, simpler, implementation would PMI every processor, similar to SMI. A third variant might use the PMI Pin event (PMI vector 0) to all or only one processor. Many more variants are possible. The fundamental additional hardware requirement is that the platform chipset 508 contain one or more functions that can be described as ACPI operation regions in the ACPI tables and that are capable of initiating a PMI event message to at least one working processor in the system.

A non-standard AML method is written and placed in ACPI name space. OS software is written that "knows" the name and function of this method. The method can be placed anywhere in the hierarchical name space, but it makes the most sense to place it under the root scope. Given these capabilities, we can now describe the sequence illustrated in FIG. 5.

Message 1, represented in FIG. 5 by a path 512, represents the OS 500, having (optionally) previously returned control of all processors 514a, 514b, other than a target processor 514c to SAL 516 via the architected branch address passed to the OS in B0 at boot time, invoking the AML method 504 to initiate the EFI fast reset. In message 2, represented by a path 518, the AML method 504 then accesses the platform chipset 508 register to initiate the PMI event. Message 3, represented by a path 520, indicates the PMI event sent to the target processor 514c. The messages and steps represented by paths 524, 525, 526, 527, 528, 529, and 530 correspond exactly to the respective messages and steps represented in FIG. 4 by paths 412, 416, 410, 418, 422, 424, and 426, respectively, and will therefore not be described in further detail.

The following is an explanation of implementation of a "safe" fast reset. In particular, while it is necessary to place each processor (in a multiprocessor IPF system) in a know state prior to invoking the EFI fast reset function, this may not always be possible using OS software. This may occur, for example, if one or more processors are "hung" and the OS cannot regain control of them, due to software or hardware causes, or the OS simply does not want to or know how to "clean up"—it just wants to "Reset Now", but it wants to try and do so using the fast reset feature.

The consequences of not cleaning up for EFI fast reset, such that processors are left hanging, is very serious, because the OS is going to be reloaded and restarted, so any processors left executing somewhere that firmware is not aware of will cause trouble. This trouble is not possible for the normal EFI ResetSystem( ) because the system will just go through a hard reset and all of the processor will begin executing in firmware at the PALE_RESET vector.

Accordingly, if an OS chooses not to or is not capable of rendezvousing all processors, firmware regains system sanity by forcing a rendezvous of all processors. Once a single processor enters SAL for the purpose of performing the EFI fast reset, SAL can force all processors to a known state. This is true whether the invocation enters SAL from the top through a procedure call (EFI or SAL) or from the bottom through a PMI event.

SAL only needs one processor to do this forced rendezvous using either PMI or INIT transactions sent to al remaining processors not already under SAL control. If it is not possible to regain control of every processor in the system, prior to beginning initialization of the EFI layer, SAL could perform a full (cold or warm) reset. Alternatively, SAL could enter a diagnostic mode instead of trying to load the OS into an unstable platform by continuing with the fast reset function.

The foregoing is included to specify that all embodiments of the fast reset function described herein utilize available and architected IPF mechanisms to attempt to perform a "forced rendezvous" before continuing with reinitialization of the EFI layer to complete the fast reset operation.

An implementation of the invention described herein thus provides a mechanism for enabling a fast reboot, or reset, of a computer system platform. It is believed that the operation and construction of the present invention will be apparent from the foregoing Detailed Description. While the system and method shown and described have been characterized as being preferred, it should be readily understood that various changes and modifications could be made therein without departing from the scope of the present invention as set forth in the following claims. For example, while specific implementation examples have been described in reference to an exemplary implementation of the present invention using Intel IPF architecture, such implementations are merely illustrative. Moreover, the exemplary multiprocessor system may be architected in any known or heretofore unknown configuration, e.g., symmetrical multiprocessing ("SMP") systems, asymmetrical multiprocessing ("AMP") systems, loosely-coupled MP systems, tightly-coupled MP systems, and the like. Accordingly, all such modifications, extensions, variations, amendments, additions, deletions, combinations, and the like are deemed to be within the ambit of the present invention whose scope is defined solely by the claims set forth hereinbelow.

What is claimed is:

1. A method of implementing an expedited reset of a computer system including an operating system ("OS"), hardware, and firmware disposed therebetween, the method comprising:
   receiving a fast reset request; and
   responsive to receipt of the fast reset request, omitting at least a portion of setup of a System Abstraction Layer ("SAL") of the firmware and transferring control of the computer system to a software interface disposed between the OS and the firmware.

2. The method of claim 1 wherein the interface between the OS and the firmware comprises an Extensible Firmware Interface ("EFI").

3. The method of claim 2 wherein fast reset request comprises an EFI function call.

4. The method of claim 2 wherein the EFI includes an EFI system reset function having a reset type parameter for specifying a type of reset to be performed, the method further comprising the step of defining a new value for the reset type parameter.

5. The method of claim 4 wherein the fast reset request is implemented by calling the EFI system reset function with the reset type parameter set to the new value.

6. A method of implementing an expedited reset of a computer system including an operating system ("OS"), hardware, and firmware disposed therebetween, the method comprising:
   responsive to a reset event, determining whether the reset event is a normal reset event;
   if the reset event is a normal reset event, initiating a full reset of the computer system; and
   if the reset event is other than a normal reset event, implementing a fast reset of the computer system, wherein the fast reset comprises omitting at least a portion of setup of a System Abstraction Layer ("SAL") of the firmware and instead substantially immediately initializing an interface disposed between the OS and the hardware of the computer system.

7. The method of claim 6 wherein the interface between the OS and the hardware comprises Extensible Firmware Interface (EFI).

8. The method of claim 7 wherein the reset event comprises an EFI function call.

9. The method of claim 7 further comprising the step of defining a new EFI function for initiating a fast reset of the computer system, wherein the reset event comprises calling the new EFI reset function.

10. The method of claim 7 wherein the EFI function call comprises an EFI Reset function, the method further comprising the step of defining a new reset type for the EFI Reset function, wherein the reset event comprises calling the EFI Reset function with the reset type set to the newly defined reset type.

11. A system for implementing an expedited reset of a computer system including an operating system ("OS"), hardware, and firmware disposed therebetween, the system comprising:
   means for determining whether the reset event is a normal reset event;
   means for initiating a full reset of the computer system if the reset event is a normal reset event; and
   means for implementing a fast reset of the computer system, if the reset event is other than a normal reset event, wherein the fast reset comprises omitting at least a portion of setup of a System Abstraction Layer ("SAL") of the firmware and instead substantially immediately initializing an interface disposed between the OS and the hardware of the computer system.

12. The system of claim 11 wherein the interface between the OS and the hardware comprises Extensible Firmware Interface ("EFI").

13. The system of claim 12 wherein the reset event comprises an EFI function call.

14. The system of claim 12 further comprising new EFI function for initiating a fast reset of the computer system, wherein the reset event comprises calling the new EFI reset function.

15. The system of claim 12 wherein the EFI function call comprises an EFI Reset function, the system further comprising a new reset type for the EFI Reset function, wherein the reset event comprises calling the EFI Reset function with the reset type set to the newly defined reset type.

16. A computer system comprising:
   an operating system ("OS");
   platform hardware;
   processor hardware;
   firmware disposed between the platform and processor hardware and the OS; and
   a software interface between the firmware and the OS, the software interface for enabling a plurality of function calls,
   wherein, responsive to a fast reset event, a fast reset of the computer system is executed, the fast reset comprising omitting at least a portion of setup of a System Abstraction Layer ("SAL") of the firmware and instead immediately initializing an interface between the OS and the platform hardware of the computer system.

17. The computer system of claim 16 wherein the interface between the OS and the platform hardware comprises an Extensible Firmware Interface ("EFI").

18. The system of claim 17 wherein the fast reset event comprises an EFI function call.

19. A method of implementing an expedited reset of a computer system including an operating system ("OS"), hardware, and firmware disposed therebetween, the method Comprising:
   responsive to receipt of a fast reset request, omitting at least a portion of setup of a System Abstraction Layer ("SAL") of the firmware and transferring control of the computer system to an Extensible Firmware Interface ("EFI") disposed between the OS and the firmware, wherein the EFI includes an EFI system reset function having a reset type parameter for specifying a type of reset to be performed; and
   defining a new value for the reset type parameter to specify the fast reset request.

* * * * *

UNITED STATES PATENT AND TRADEMARK OFFICE
CERTIFICATE OF CORRECTION

PATENT NO. : 6,963,970 B2
APPLICATION NO. : 10/136580
DATED : November 8, 2005
INVENTOR(S) : Bradley Culter et al.

It is certified that error appears in the above-identified patent and that said Letters Patent is hereby corrected as shown below:

In column 2, line 2, delete "EFT" and insert -- EFI --, therefor.

In column 4, line 28, delete ""EFIResetFasto"" and insert -- "EFIResetFast()" --, therefor.

In column 4, line 40, delete "EFIResetFasto" and insert -- EFIResetFast() --, therefor.

In column 4, line 49, delete "EFIResetFasto" and insert -- EFIResetFast() --, therefor.

In column 4, line 55, delete "EFIResetFasto" and insert -- EFIResetFast() --, therefor.

In column 5, line 31, delete ""EFIResetFasto"" and insert -- "EFIResetFast()" --, therefor.

In column 6, line 7, delete "T1," and insert -- T0, --, therefor.

In column 11, line 42, in Claim 7, delete "(EFI)" and insert -- ("EFI") --, therefor.

In column 12, line 48, in Claim 19, delete "Comprising" and insert -- comprising --, therefor.

Signed and Sealed this

Eleventh Day of August, 2009

David J. Kappos
*Director of the United States Patent and Trademark Office*